United States Patent

Spector

[11] Patent Number: 5,923,400
[45] Date of Patent: Jul. 13, 1999

[54] REAL-TIME FILM ANIMATION TECHNIQUE

[76] Inventor: Donald Spector, 380 Mountain Rd., Union City, N.J. 07080

[21] Appl. No.: 08/218,822

[22] Filed: Mar. 28, 1994

[51] Int. Cl.[6] .............................. G03B 19/18; G03B 21/32
[52] U.S. Cl. ................................................. 352/45; 352/87
[58] Field of Search .................................. 352/45, 46, 50, 352/51, 52, 87

[56] References Cited

U.S. PATENT DOCUMENTS

| | | | | |
|---|---|---|---|---|
| 2,181,405 | 11/1939 | Kosa, Sr. | | 352/51 |
| 2,461,127 | 2/1949 | Pickley | | 352/45 |
| 2,998,313 | 8/1961 | Maurer | | 352/46 |
| 3,301,626 | 1/1967 | Maurer | | 352/45 |
| 4,417,791 | 11/1983 | Erland et al. | | 352/45 |
| 4,457,599 | 7/1984 | Sawicki | | 352/89 |
| 4,695,141 | 9/1987 | Servais | | 352/50 |

*Primary Examiner*—Eddie C. Lee
*Attorney, Agent, or Firm*—Michael Ebert

[57] ABSTRACT

A technique for producing an animated film whose cartoon characters and their movements are impersonated by living actors. The scenes of the film are shot by a blue-screen matte cinemaphotography system adapted to exclude blue surfaces from the camera filming the cartoon character. The cartoon character seen by this camera is created by a living actor enveloped head-to-toe in a blue-dyed body suit that renders the actor invisible to the camera. Painted on the front and rear surfaces of the body suit in colors other than blue is a drawing of the cartoon character, animation being imparted thereto in real time by the actor's movements.

6 Claims, 1 Drawing Sheet

REAL-TIME FILM ANIMATION TECHNIQUE

BACKGROUND OF INVENTION

1. Field of Invention

This invention relates generally to the production of animated films, and in particular to a technique in which the cartoon characters in the film and their movements are created in real time by invisible living actors.

2. Status of Prior Art

The pioneer producers of animated films regarded these films as moving comic strips, and no effort was made on the part of animators to conceal the fact that the characters were just moving drawings. It was Walt Disney who later created characters having humanoid qualities, the characters playing a role in stories, such as the Three Little Pigs and Snow White.

Animated film has its roots in the flipbook in which as one flips the pages, the figures drawn on these pages appear to move. The closer the various parts of a figure on one page are to the positions of corresponding parts of the figure on the preceding page, the slower the apparent motion of the figure, while the greater the displacement, the faster the apparent motion.

The pages of a flip book are bound together to ensure registration. In making drawings for an animated film, in order to maintain registration, the papers on which the drawings are made are provided with punch holes that fit onto pegs anchored on a drawing board. In the center of the drawing board is a glass plate behind which is a light box. The drawing paper is thin and translucent, and when four or five sheets of paper are stacked over the illuminated glass plate, the animator is then able to see the animation on these sheets and he can gauge the position of the animation to be made on the next drawing.

Animation of cartoon characters is a complex procedure. In a commercial animation studio, the principal animator draws the key movements of a cartoon character to be animated. He then numbers the several drawings which cover these movements and annotates them on an exposure sheet. This work is then transferred to an assistant animator who follows the instructions on the exposure sheet and adds more drawings to the set. Then a second assistant animator provides additional "in-between" drawings. In this way, movement of the character takes place from drawing-to-drawing in small increments. The greater the number of drawings covering a particular movement, the less jerky it appears when the animated film is viewed.

The set of drawings produced in this fashion are then photographed in sequence by an animation camera, and the resultant footage is shown in a projection room to the director of the film and the principal animator who make corrections and additions. The revised animation is reshot and screened once again. When the drawings are finally approved, they are transferred to acetate sheets called cels, and these are colored by an artist. The cels, which are transparent, are then combined with background paintings for every scene to provide a complete picture.

After color negatives of the pictures have been made, the color negatives and the sound track prepared for these pictures are sent to a film laboratory where an animation print is struck off.

With modern computer animation, it is now possible to dispense with the services of assistant animators. To do this, the principal animator provides two drawings of a given cartoon character representing the extremes of a particular movement. Thus one drawing could be that of Donald Duck looking very happy, and the other of Donald Duck looking downcast. These two extremes of expression are inputted into the computer which which then proceeds to grind out any desired number of in-between drawings of Donald Duck.

But whether the multitude of drawings necessary to impart animation to a cartoon character are drawn by skilled artists or are in part contributed by a computer, conventional film animation technique and highly complex, time consuming and expensive. Even a short animated film requires thousands of character drawings.

SUMMARY OF INVENTION

The main object of this invention is to provide a technique for producing an animated film whose cartoon characters and their movements are created in real time by invisible living actors.

A significant advantage of this technique is that it dispenses with the need to create a multitude of cartoon character drawings to impart animation to the cartoon characters; hence it becomes possible to produce animated films quickly and at relatively low cost.

More particularly, an object of this invention is to provide a technique of the above type in which the actor impersonating a cartoon character is enveloped in a body suit to which the camera photographing the character is insensitive, and, therefore, effectively sees only the character drawn on the surfaces of the body suit.

A salient feature of a technique in accordance with the invention is that the movements imparted to the cartoon character are not movements created by animators who draw the character, but by the body language of the invisible actor impersonating the character; hence the movements are more realistic.

Briefly stated, these objects are attained by a technique for producing an animated film whose cartoon characters and their movements are impersonated by living actors. The scenes of the film are shot by a blue-screen matte cinemaphotography system adapted to exclude blue surfaces from the camera filming the cartoon character. The cartoon character seen by this camera is created by a living actor enveloped head-to-toe in a blue-dyed body suit that renders the actor invisible to the camera. Painted on the front and rear surfaces of the body suit in colors other than blue is a drawing of the cartoon character, animation being imparted thereto in real time by the actor's movements.

BRIEF DESCRIPTION OF DRAWING

For a better understanding of the invention, as well as other objects and features thereof, reference is made to the detailed description of the invention to be read in conjunction with the accompanying drawing, wherein.

DESCRIPTION OF INVENTION

A technique in accordance with the invention for producing an animated film whose cartoon characters and movements are created by living actors, makes use of a blue-screen matte cinemaphotography system to photograph the cartoon characters impersonated by living actors who are invisible to the camera shooting the characters.

In cinemaphotography "matte" refers to a plate or filter placed in a camera to obscure or block out an area of the scene being filmed. In order to combine a shot of an actor photographed on a sound stage with a background scene photographed elsewhere, use is currently made in movie studios of travelling mattes which simulate exterior scenes and make it possible to incorporate in a film, visual details recorded at distant locales. By the use of travelling mattes one may jigsaw the moving figure of an actor into a background image and thereby produce a realistic composite in motion, such as Superman flying over the skyscrapers of New York City.

A blue-screen travelling matte cinemaphotography system has been used in virtually every special effect movie including "Star Wars" and "Who Framed Roger Rabbit." The latter movie is notable for composite images that combine cartoon characters with living actors. In a technique in accordance with the invention, living actors who are invisible to the camera, impersonate the cartoon characters.

In a blue-screen cinemaphotographic process, whatever appears in a scene that is colored blue is excluded from the movie camera shooting this scene, and in the final film the excluded area is supplanted by an image taken by another camera to create a composite image. The area which is excluded by the blue-screen may be in the foreground or in the background of the scene.

One well-known blue-screen matte system is the Chromakey system which is used in TV and in cinemaphotography to produce a composite color image in which the separate image elements are matted together. In the Chroma-key system, the camera yields an image of a performer in front of a blue screen. A second camera provides the background of the composite image. When applied to TV cameras, the composite images appear instantly on the video monitor screen.

A blue-screen system regarded as superior to the Chromakey system is the ULTIMATTE electronic compositor, invented by Petro Vlahos, now in widespread use. The ULTIMATTE compositor produces a high-quality composite image in which the matte lines typical of a Chroma-key system are absent. The various types of blue-screen matte cinemaphotography systems that are now in use are disclosed in the text "The Technique of Special Effects Cinematography" (Fourth Edition) by Raymond Fielding—Focal Press.

A technique in accordance with the invention makes use of a blue-screen matte cinematography system of any known type, and is not limited to a Chroma-key or ULTIMATTE system for this purpose.

Figure 1:
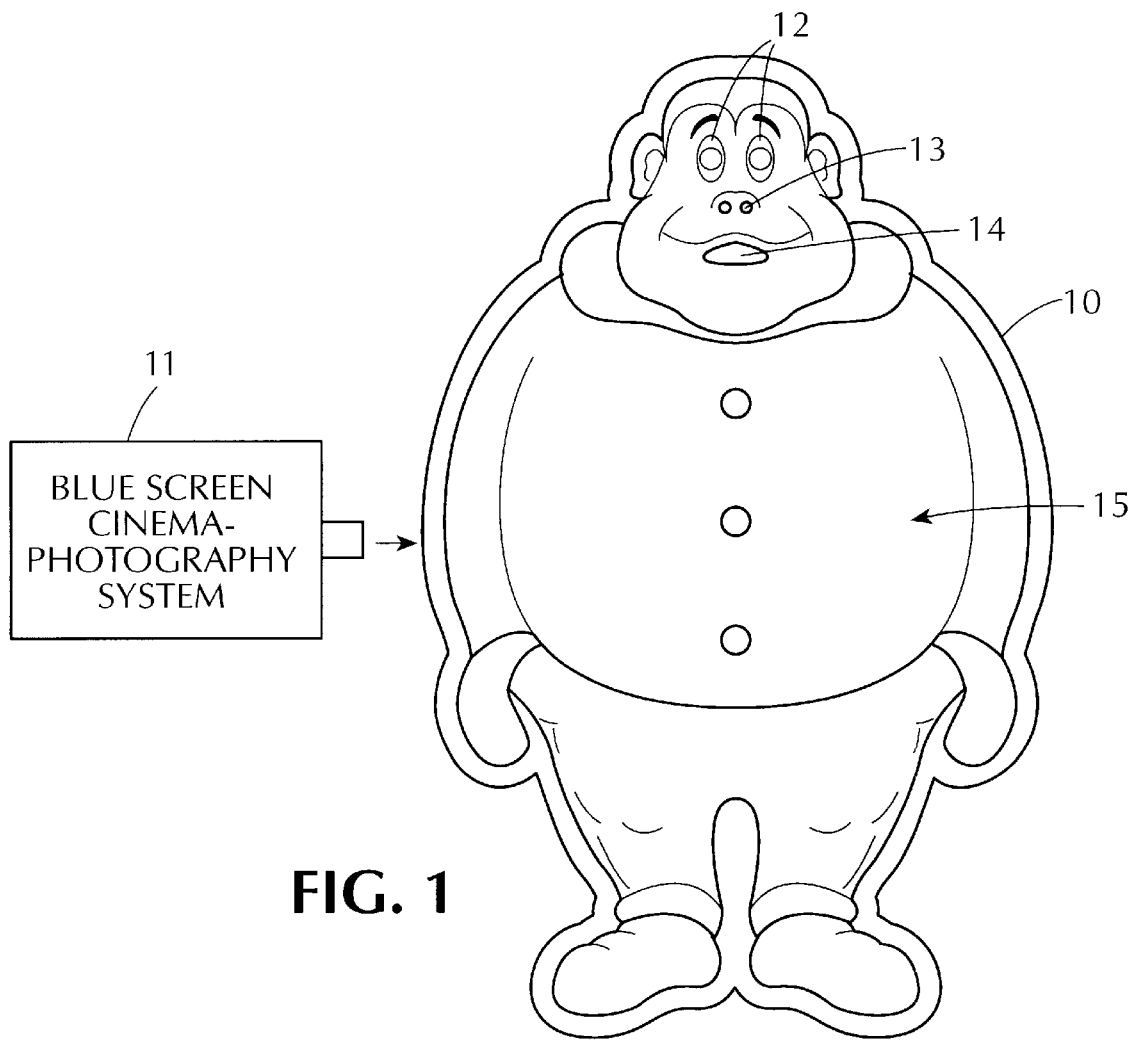
FIG. 1 shows a living actor wearing a body suit on whose surface is drawn a cartoon character, the covered actor being photographed by a blue-screen matte cinemaphotography system.

As shown in FIG. 1, in order to provide real time animation of a cartoon character in producing an animated film, use is made for this purpose of a living actor who is enveloped from head-to-toe in a fabric body suit 10 which may be formed of woven or knitted material or synthetic fibers. The fabric is dyed cobalt blue or whatever other shade of blue is appropriate to the blue-screen matte system 11 being used to photograph the actor. No part of the actor is exposed by the body suit except for eye openings 12, nostril openings 13 and a mouth opening 13. These openings make it possible for the performing actor to breathe and see, and are preferably in slit form.

The body suit, in addition to a head and neck piece, which conceals the head and neck, includes hand mittens joined to the sleeves of the suit to conceal the hands, and socks joined to the legs of the suit to conceal the feet. The suit is provided with blue-colored Velcro fasteners or slide fasteners so that the actor can don the suit or get out of it without difficulty.

Painted or drawn on the front of body suit 10 in colors other than blue is the front view of a character 15 which by way of example is an obese clown-like figure in a clown costume.

Thus the head and neck of the cartoon character are painted on the fabric head piece of the body suit, the hands are painted on the mittens of the body suit, and the shoes worn by the cartoon character are painted on the socks of the body suit. The rear of the body suit has drawn or painted thereon the rear of the same cartoon character.

It is important to bear in mind that in this technique, the actor is not dressed and made up to resemble a cartoon character for there is a highly perceptible difference between a drawing of a cartoon character and individual made up to resemble a cartoon character. Thus in the movie "Popeye," the actor Robin Williams who clenches a corncob pipe in his teeth was made up to resemble the Popeye of the classic Popeye animated films But Popeye, the actor, could never be confused with Popeye, the cartoon character, for a cartoon character drawing is an abstraction of an animal-like or humanoid figure.

In order to give the cartoon character a somewhat flat, two-dimensional appearance as in a conventional cartoon drawing, the side edges of the body suit are painted to form a solid black stripe so that the character appears to lack depth. However, the side edges may be painted to impart some degree of depth to the character.

The eye, nose and mouth openings are integrated into the character drawing so that they are obscured. Thus the eye openings are surrounded by painted circles which define the eyes of the character, and the mouth opening is surrounded by the painted lips of the character.

Figure 2:
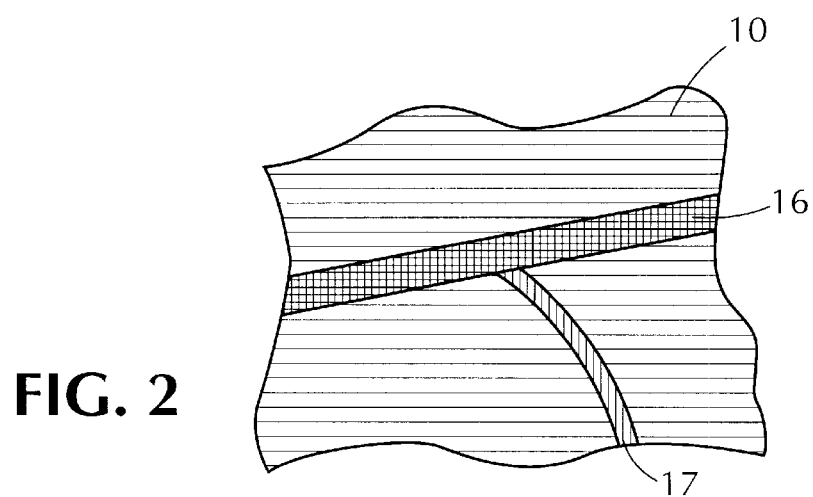
FIG. 2 shows a portion of the body suit.

As shown in FIG. 2, the cartoon character drawn on the fabrics of the blue-colored body suit 10 may include a band 16, colored yellow, and a band 17, colored red. These colored bands will be picked up by the camera photographing the character, but the blue-colored body suit and the living actor therein are invisible to the blue-screen matte camera photographing the character.

The blue-screen cinemaphotography system is adapted to form a composite film of the animated character with a photographed background scene appropriate to the character and the story line of the animated film.

Thus a technique in accordance with the invention makes possible real time animation to produce animated films involving cartoon characters at a far lower cost and much more quickly than has heretofore been possible with animated films which require thousands of character drawings to impart animation to the cartoon character.

While there has been shown a preferred technique in accordance with the invention, it will be apparent to those skilled in the art that many changes may be made thereon without departing from the spirit of the invention. Thus while the matte cinemaphotography system is described as being of the blue screen type in which surfaces having a blue color are blocked out of the scene being filmed, a matte effect may be obtained by using a color other than blue for this purpose. And while the cartoon character to be animated has been described as having a humanoid or animal-like form, in practice, this character may have an abstract or imaginative figurative form created by the artist who paints the character.

I claim:

1. A technique for producing an animated film whose cartoon character and its movements are impersonated by a living actor, having a particular appearance, said technique comprising the steps of:

A. enveloping the actor in a body suit dyed a specific solid color which totally covers the actor from head to toe except for small openings permitting the actor to see and breathe;

B. painting on the surfaces of the body suit in colors other than the specific color a drawing of said cartoon character whose appearance is that of the cartoon character and is unrelated to the appearance of the actor; and C. photographing the body-suit covered actor with a special-effects, matte cinemaphotography system adapted to exclude surfaces colored with the specific color from the camera filming the cartoon character, thereby rendering the covered actor invisible to the camera, the filmed cartoon character being animated in real time by the invisible actor's movements, said specific color being blue and the cinemaphotography system is of the blue-green type, said system yielding a film which is a composite of the animated cartoon character and background scenes appropriate to the character.

2. A technique as set forth in claim 1, in which front and rear views of the cartoon character are painted on the corresponding sides of the body suit whose edges have a solid stripe painted thereon to deprive the painted character of apparent depth.

3. A technique as set forth in claim 1, in which the body suit is formed of fabric material dyed cobalt blue.

4. A technique as set forth in claim 3, in which the body suit includes a head piece joined to the torso of the suit, hand mittens joined to the sleeves of the suit, and feet socks joined to the legs of the suit so that no part of the actor is exposed.

5. A technique as set forth in claim 1, in which the cartoon character has a humanoid or animal-like form.

6. A technique as set forth in claim 1, in which the cartoon character has an abstract figurative form.

* * * * *